Patented June 15, 1937

2,083,549

UNITED STATES PATENT OFFICE 2,083,549

THE MANUFACTURE OF SULPHURIZED ORGANIC ISOCOLLOIDS

László Auer, Budapest, Hungary, and Paul Stamberger, London, England, assignors to J. Randolph Newman, Washington, D. C., trustee No Drawing. Application May 6, 1929, Serial No. 361,000. Renewed February 18, 1936 In Great Britain May 10, 1928

25 Claims. (Cl. 106—23)

This invention relates to the vulcanization of unsaturated organic isocolloid compounds and it comprises improved methods of sulphurizing organic isocolloids, such as fatty oils, resins, etc., capable of being sulphurized, wherein the vulcanizing agent, sulphur, etc., is first dispersed throughout or dissolved in the material to be vulcanized, at suitable temperatures, advantageously under such conditions that molten sulphur is brought into contact with said vulcanizable material, without permitting complete vulcanization to the final insoluble, infusible state (solid at vulcanizing temperatures), and thereafter, dispersing or emulsifying the so obtained sulphur-containing material, advantageously while in fluid form, in an aqueous medium or liquid at suitable temperatures, any further vulcanization of the said material being effected while such material is maintained in the dispersed or emulsified form, advantageously by subjecting said emulsion to suitable temperatures and pressures, without hydrosaponifying the vulcanized products, any such heating of the emulsion being at temperatures below 160° C., advantageously between 70° and 140° C., and wherein the isocolloid products are sometimes further modified or bodied by incorporating a modifying agent or polar compound, advantageously a metal salt, in the material prior to adding the sulphur or into the said emulsion or both, and wherein the material is sometimes partially vulcanized to a definite stage prior to emulsification and then further vulcanized while so emulsified, if desired; and it also comprises the aqueous emulsions so obtained, both those containing partially or fully vulcanized products and those which are suspensoids or true emulsions, either with or without added latex, etc., and the vulcanized products recovered by isolating them from the said aqueous liquid, all as more fully hereinafter set forth and as claimed.

In practicing the present invention, various embodiments thereof may be employed. Typical embodiments are given post for purposes of illustrating advantageous embodiments thereof. They are not limitative of this invention, as the other variations indicated may also be used.

By the term vulcanization, as here used, we mean those processes wherein sulphur, in some form, is taken up by an unsaturated organic compound, for instance, rape oil, etc., to so alter its physical properties that the sulphurized product obtained has an increased resistance to deformation, that is increased viscosity, greater elasticity, etc., as compared to the original organic compound. As the sulphurized products, as directly obtained in the methods here emloyed, are in the form of aqueous emulsions thereof, the alteration in said physical properties is not always directly apparent; but when recovered from such emulsions, the changed properties of the sulphurized product can then be easily observed and measured.

It has been suggested (see Journal of the Society of Chemical Industry, Vol. 45, pages 115 T-121 T, article by Whitby and Chataway; and Recueil des Travaux Chimiques, Vol. 46, pages 836-840, article by Stamberger) that vulcanization proceeds in at least two stages. In the first stage there is a dispersion of sulphur through the material to be vulcanized, with the probable formation of an addition sulphur compound; at least there is a blending of the two materials. In the second or subsequent states, this product undergoes colloidal modification, the molecules being converted into aggregated bodies. The first stage may be completed at comparatively low temperatures, whereas for the subsequent stages higher temperatures (or prolonged time at lower temperatures) were thought to be necessary, and such has been the practice in the prior art. Irrespective of theory, it is well known that the products of the first stage are generally liquid, semi-solid or pasty substances, readily soluble in the usual solvents. The final products on the other hand, are generally solid, elastic colloids, which swell but do not dissolve in these solvents.

Heretofore, the general practice has been to simply introduce the sulphur and the material to be vulcanized into a suitable vessel and agitate and heat them to the required temperature until the final product desired was obtained. In this way, various oils, such as fatty oils and other vulcanizable materials molten at vulcanizing temperatures, have been sulphurized, for many years. With such methods, it is difficult to consistently obtain good sulphurized products. As is well known, it is difficult to obtain uniform reaction and there is danger of local overheating, charring, etc., particularly as the reaction progresses and the product becomes more viscous. It is also well known that the heating is discontinued before the final stage is reached and the product withdrawn from the vessel while still fluid and cooled in suitable containers, the reaction more or less continuing until the product is sufficiently cooled. Further, it is quite difficult to emulsify those products, particularly the solid ones, in aqueous liquids.

We have now found means of overcoming many of the difficulties encountered in the prior processes, by using a two step method. We have found that if, after the sulphur or sulphur-containing vulcanizing agent is dispersed or dissolved (blended) in the said organic material but before the vulcanization has been completely carried to the final stage, a fluid mix thereof is dispersed or emulsified in an aqueous medium or liquid, the sulphurized product, while in the emulsified form, will become further vulcanized under suitable conditions. By varying the amount of vulcanization in each of the two steps, a wide range of products may be obtained as shown in the illustrative examples given post. If the vulcanization in the first step is a far-going one, the vulcanization might become complete when the product has been fully emulsified, such being the case in some of the methods disclosed in the copending application Ser. No. 370,733 filed by Laszlo Auer, one of the present applicants; those methods being procedures wherein a current of steam is passed through the heated mixture during vulcanization and part of it condensed to directly emulsify the vulcanized products as formed. In the present invention, it is preferable to emulsify the reaction mixture in the earlier stages and complete the desired vulcanization while the products are in the emulsified form. In that way, superior emulsions and final products recovered from the treated emulsions, are obtained.

Thus in the general practice of the present invention, the usual procedure is to first disperse the sulphur throughout the material to be vulcanized and thereafter emulsify the sulphur-containing material so obtained, in the aqueous liquid and subject this emulsion to suitable temperature and pressure, if they be needed, to complete the vulcanization to the desired final state.

Advantageously, an initial vulcanization which gives particularly good results in the present processes, is that needed to complete the first stage in the description given by the forementioned authors, to wit, an initial product which is substantially insoluble in acetone, but still soluble in benzene; the amount of benzene-insoluble matter being as far as possible nil. The original material is soluble in both acetone and benzene. The formation of appreciable amounts of benzene-insoluble matter indicates that the final stage in the vulcanization has commenced. The point of acetone-insolubility and benzene-solubility is a good point to change to vulcanization with the material in the emulsified form. For one thing, benzene may be used to dissolve the initial product and render it freely fluid, even at low temperature, for the emulsifying step. This is specifically illustrated in Examples 3 and 6. However as shown in other illustrative examples, this is not required when the hot material is emulsified at elevated temperatures; temperatures at which a fluid product is contacted with the aqueous liquid, as shown in Example 1, etc. After it is emulsified in any suitable way, the emulsion is stirred and heated until the product becomes substantially insoluble in benzene, as stated ante. These emulsions may be directly used for some purposes or the final vulcanized product recovered as a solid material if desired, as shown post.

The aqueous medium may consist of an oil emulsion in water or an aqueous glycerol solution or a solution such as a starch solution and the emulsification may be effected with the aid of the usual emulsifying agents, such as soaps, sulphonated oils and their salts, sulphonated alkylated aromatic hydrocarbons and their salts, albumen, saponin, phenols and their metal compounds, and the like. The emulsifying agent may be dissolved or dispersed in the aqueous medium or in the material to be emulsified, or it may be produced in situ. The initially vulcanized or sulphurized material may also be dissolved in an organic solvent (e. g. benzene, petroleum ether, chloroform, etc.) and this solution emulsified in the aqueous medium, with or without removal of the solvent.

The treatment with water is continued until a sufficient degree of vulcanization has been reached. The products are suspensions or emulsions of vulcanized isocolloids and the isocolloids when separated from the emulsions show improved elasticity and resilience.

In the preliminary treatment with sulphurizing agents, and/or the subsequent treatment with water, it is often advantageous to add an accelerator in presence or absence of an activator such as zinc oxide.

We have further found that the same process is applicable to the sulphurization or vulcanization of the modified organic isocolloids obtainable by the processes described in the copending applications of one of the present applicants, to wit, the Auer application Ser. No. 143,786 and the various divisions and continuations thereof such as Ser. Nos. 359,425; 359,427; 359,428; 273,159; 273,160 and 359,424 and gives products which approximate to those obtained by these processes although differing from the products which are obtained by the processes above described. The use of such modified organic isocolloid products is illustrated in several of the typical embodiments given post. As stated in the said parent application Ser. No. 143,786, in the generic procedure of such methods the organic isocolloid is modified by dispersing or dissolving a minor amount of an electrolyte or polar compound therein, at room temperature or elevated temperatures. When temperatures of 200° C. or above are employed, particularly with fatty oils, and the heating continued after the polar compound is dissolved, the composition may also become heat-bodied, as specifically shown in Ser. No. 359,425, the main division of Ser. No. 143,786. Such modified products are more or less thermoplastic and are useful here. As specifically stated in the said applications such products may be vulcanized with sulphur or sulphur-containing vulcanizing agents. By using the present improved method of sulphurization, better vulcanized products are obtained from them. Those modified organic isocolloid products contain a minor amount of polar compounds dispersed therein. Those obtained with the aid of metal salts are advantageous here and their use is specifically shown in some of the examples post. Also as shown in Examples 4 and 8, a metal salt or modifying agent, such as cadmium iodide, may be added to the emulsions here, to further modify the present products in such emulsions.

The present invention is not limited to sulphurizing fatty oils, but also comprises treating such isocolloids capable of being sulphurized with said vulcanizing agent to effect initial vulcanization and thereafter forming an emulsion or suspension of the incompletely vulcanized body or otherwise bringing it into intimate contact with an aqueous medium and subjecting it in this condition to a suitable temperature and pressure until the desired degree of vulcanization is attained.

The vulcanizing may be carried out in the presence of an accelerator (for example mercaptobenzthiazole) with or without the further addition of an activator (for example zinc oxide).

An oil or a resin modified by treatment with an electrolyte or other modifying agent as previously described is first heated with sulphur or a sulphurizing agent for a longer or shorter period, which must, however, be less than is required for complete vulcanization and need only be sufficient for a thorough incorporation or dispersion of sulphur in the material. The temperature of this preliminary treatment should be a temperature at which the first stage of vulcanization can be performed. We prefer, generally, a temperature of 120° to 160° C., but lower or higher temperatures may be employed in many cases, the only essential being that the sulphur shall be distributed through the material and that the first of the series of changes involved in vulcanization shall have taken place. If, for example, the starting-material requires half-an-hour at 160° C. for complete vulcanization, we may vulcanize at 160° C. for, say, 5 minutes, 10 minutes or any other period short of 30 minutes. The degree of initial vulcanization desirable to give best results according to our invention is that needed to complete the initial stage in the vulcanizing process, i. e. it must be of such a degree that the amount of acetone-insoluble matter in the mass is increased to as great an extent as is possible with the mixture in question without the formation of benzene-insoluble matter in appreciable quantity.

The next step in this process is to treat the initially vulcanized substance with water, or to convert it into an emulsion with water, or other aqueous liquid, such, for instance, as an oil emulsion in water, aqueous glycerol solution, or other aqueous solution (e. g. of starch) which does not prevent emulsification or coagulate the emulsion when made, with the aid of the usual emulsifying agents, such as soaps, sulphonated oils and their salts, sulphonated alkylated aromatic hydrocarbons and their salts, albumen, saponin, phenols and their metal compounds and the like. The emulsifying agent may be dissolved or dispersed in the aqueous medium or in the material to be emulsified, or may be produced in either in situ. The initially vulcanized or sulphurized material may also be dissolved in an organic solvent (e. g. benzene, petroleum ether, chloroform, etc.) and this solution emulsified in the aqueous medium with or without removal of the solvent.

The treatment with water is continued until a sufficient degree of vulcanization has been reached. The products are suspensions or emulsions of vulcanized modified isocolloids which show improved elasticity and resilience in comparison with the modified isocolloids vulcanized in the manner described in the previous applications.

In the preliminary treatment with sulphurizing agents and/or the subsequent treatment with water it is often advantageous to add an accelerator in presence or absence of activators such as zinc oxide.

The emulsions (true emulsions or suspenoid emulsions) of vulcanized or sulphurized materials obtainable according to this invention are valuable in the arts for a variety of purposes. They may be concentrated, for example, and used for impregnating textiles; or the disperse phase may be separated in solid form by means of the usual coagulating agents, or by drying (as e. g. when the aqueous dispersions are used for varnishes), or it may be deposited on forms by dipping (in which case it is advantageous to cover the form with a coating containing a coagulant), or by electrosmosis or by electrophoresis; or the disperse phase may be separated from the dispersion medium by ultra-filtration. When, in an electrophoretical deposition, no semipermeable supports are used, electrolytic decomposition of the water should be avoided.

The emulsions may be used for any of the purposes mentioned either alone or in admixture with natural or artificial rubber latex, which may or may not have been previously vulcanized. The combination of the emulsions with rubber latex is specially advantageous; on drying, the particles of rubber and the new product adhere well together on the substratum.

Filling materials, pigments and the like, may be added at any convenient stage. The addition of metal-free organic compounds such as alcohols, ketones, phenols, amines etc. has in some cases a desirable effect in modifying the properties of the products.

The processes may often be advantageously influenced by exposing the materials to the action of radiations such as X-rays, ultraviolet rays, or on electric potential. In certain cases the vulcanized product, before separation from the emulsion, may be made to undergo an after-treatment with electrolytes or other modifying agents (as described in the above mentioned co-pending applications) in order to obtain a product with further improved properties.

If desired the processes described herein may be performed in closed vessels. The temperature may be chosen according to the nature of the material used and the product desired. In most cases room temperature is sufficient.

The invention is illustrated but not limited by the following examples in which the parts are by weight.

*Example 1*

200 parts of linseed oil are well mixed with 30 parts of sulphur, 4 parts of tetramethylthiuram disulphide, 4 parts of zinc oxide and 10 parts of oleic acid. The mixture is heated to 150° C. with vigorous stirring, allowed to cool to 120° C. and agitated at this temperature for 1 hour. Initial vulcanization is then complete. The oil mixture is then emulsified by stirring with an ammoniacal casein solution containing 4 parts of casein, 10 parts of conc. ammonia and 40 parts of water at 70–80° C., more water being added during emulsification if required.

The product is a cream coloured emulsion readily miscible with water, and on drying leaves a residue having the properties of a vulcanized oil.

Instead of emulsifying by simply stirring, it was found advantageous to use a spraying method for the emulsification. The principle of the spraying method is that two liquids, i. e. the dispersion medium and the disperse phase, are injected into a chamber from opposite sides and collide violently one with the other so as to bring about intimate mixing. For the spraying equipment fine nozzles are to be used. In order to force the liquid through the nozzle for "atomizing" a current of hot or cold air or steam may be employed. In the case of steam by heating the chamber and/or the condensing liquid it is possible to regulate the concentration of the resulting emulsion. In some cases it is advisable to force the emulsion through the apparatus, in which case similar liquids collide in the chamber. In the above example the oil mixture containing the oleic acid is forced into the chamber from one side, the water containing the ammonia necessary to form with the oleic acid the ammonia oleate which will act as the emulsifying agent is forced in from the other side.

Example 2

200 parts of wood oil are heated to 120° C. and mixed at this temperature with 30 parts of molten sulphur. The mixture is then vigorously stirred for one hour at this temperature and at the end of this time 100 cc. of a 2% ammoniacal casein solution are slowly added, followed immediately by 2 parts of ammonium oleate. The temperature, which has fallen during these additions, is then raised to 110° C. and maintained there for 2 hours to complete initial vulcanization. 2 parts of colloidal zinc oxide are added and the stirring continued for a further 2 hours, small quantities of water being added from time to time if necessary. The mixture is then allowed to cool to 80° C. and a solution of 5 parts of conc. ammonia in 150 parts of water are stirred in. The product is a medium, viscous, light brown emulsion which can be used with advantage in the rubber industry in a variety of ways.

Example 3

200 parts of rape oil are heated with 30 parts sulphur, 4 parts of a zinc oxide and 4 parts of mercaptobenzthiazole exactly as described in Example 1. The product is dissolved in 500 parts of benzene and this solution added drop by drop to an aqueous solution of 10 parts of glue and 5 parts of saponin and 5 parts of glycerol plus 5 parts of a sodium soap in 200 parts of water, which is being rapidly agitated at a temperature of 75–80° C. The agitation is continued until all the organic solvent is distilled away and a stable emulsion is obtained. This emulsion is then heated under pressure in an autoclave at 140° C. for 2 hours. The product is a stable emulsion which on drying gives a hard vulcanized oil product. Both the emulsion and the dried residue are useful for a variety of purposes.

Example 4

The properties of the concentrated emulsion obtained in Example 1 may be further modified by heating the emulsion to 80–90° C. and with vigorous stirring adding an aqueous solution of 10 parts of cadmium iodide in 100 parts of water having suspended in it 5 parts of benzoquinone. The agitation is maintained at this temperature for several hours.

Example 5

200 parts of linseed oil which has been modified with the aid of sodium sulphide are well mixed in the cold state with 14 parts of sulphur, 4 parts of zinc oxide, and 4 parts of tetramethyl thiuram disulphide, and the mixture heated to 140° C., allowed to cool to 120° C. and maintained at this temperature for one hour, to effect the initial stage of vulcanization, 20 parts of oleic acid are then added and the mixture stirred for 1 hour at 120° C. This mixture is then emulsified by stirring vigorously at 80° C. with a casein solution composed of 4 parts of casein, 80 parts of water, and 20 parts of concentrated ammonia. Agitation is continued until the desired degree of dispersion is obtained. The product is a viscous emulsion which can be readily diluted with water or concentrated by heating and can be used in a variety of ways.

If all the water is evaporated off the residue has a fairly solid consistency which may be varied according to the time and conditions of emulsification.

Example 6

200 parts of wood oil which has been modified with the aid of caustic soda, are mixed with sulphur, zinc oxide, and oleic acid exactly as described in Example 5. This mixture is then dissolved in 200 parts of benzene and the solution emulsified with 200 parts of an ammoniacal casein solution made up as described in Example 5. The emulsification is here best effected by dropping the oil solution very slowly into the well agitated casein solution at 80° C., the organic solvent being volatilized away as emulsification proceeds. A further addition of 6 parts of colloidal sulphur may be made with advantage at this point. The stirring is continued for several hours until reaction is complete.

Example 7

1000 parts of castor oil which has been modified with the aid of sodium formate are heated for 2 hours at 140° C. with a paste composed of 100 parts of sulphur, 20 parts of zinc oxide, 20 parts of mercaptobenzothiazole and 50 parts of castor oil to effect initial vulcanization. After cooling the product is emulsified by stirring it vigorously at 100–110° C. with a solution of 20 parts of saponin and 10 parts of starch in 1000 parts of water, more water being added from time to time to replace that lost by evaporation. When sufficiently dispersed, the emulsion is heated under pressure in an autoclave for 2 hours. The product is a brown viscous emulsion which can be diluted with water or concentrated by heating as desired. It can be used for many purposes as formed, or the aqueous medium can be evaporated leaving a solid vulcanized oil product.

Example 8

The emulsion obtained in Example 6, may be further modified by treatment with a solution of 10 parts of cadmium iodide in 50 parts of water which has suspended in it 5 parts of benzoquinone. The warm electrolyte suspension is added slowly to the emulsion at 80° C. with vigorous stirring and the agitation continued at this temperature for several hours.

In Patent No. 639,927 issued to Lugo there is described a process wherein a vulcanized fatty oil is subjected to hydrosaponification. In our present processes hydrosaponification to any substantial extent is to be avoided. The temperatures and pressures used in vulcanizing the fatty oil in an emulsified state by present invention, while sufficient to effect vulcanization, are insufficient to produce such splitting of the fatty glyceride into glycerine and fatty acid.

What we claim is:

1. In the manufacture of vulcanized oil products from fatty oils, including raw fatty oils and modified, bodied fatty oils, the process which comprises mixing said fatty oil with a vulcanizing agent, heating the mixture until a partially vulcanized fatty oil is obtained, and then emulsifying the said partially vulcanized fatty oil in an aqueous medium and heating the emulsion thus obtained to temperatures below 160° C. to complete the vulcanization without hydrosaponifying the glyceride.

2. The process of claim 1 wherein said fatty oil is an oil of the drying and semi-drying type and said vulcanizing agent is sulphur, an ultra-accelerator and an activating agent being added to the oil in addition to the sulphur, and wherein that mixture is heated at a suitable temperature for sufficient time to partially vulcanize said fatty oil and the said emulsion obtained is subject to temperatures between 70° and 140° C. to complete the vulcanization.

3. In the manufacture of modified, vulcanized products from fatty oils of the class consisting of unmodified fatty oils and modified, bodied fatty oils, the process which comprises mixing a such fatty oil with sulphur, heating the mixture to a temperature between 120° and 160° C., until a partially vulcanized product is obtained, emulsifying the said product in an aqueous medium, further vulcanizing the said product while maintained in the emulsified form at a temperature below 160° C. until the desired degree of vulcanization is obtained, without substantially splitting the glyceride into glycerine and fatty acid.

4. The process of claim 3 wherein the finally vulcanized fatty oil is subsequently recovered in solid form from the said emulsion.

5. The process of claim 3 wherein said fatty oil is an ordinary, unbodied fatty oil and a vulcanization accelerator and an activator thereof are mixed with the oil and sulphur, and wherein the said further vulcanization, in the emulsified state, is effected at temperatures between 70° and 140° C., without splitting off a substantial amount of glycerine from the fatty oil by hydrosaponification.

6. The process of claim 1 wherein said fatty oil is an unmodified rape oil.

7. The process of claim 1 wherein said fatty oil is an unmodified linseed oil.

8. The process of claim 1 wherein said fatty oil is an unmodified China-wood oil.

9. The process of claim 3 wherein said fatty oil is a modified fatty oil and an organic accelerator and an activator thereof are mixed with the modified oil and sulphur and wherein said further vulcanization, in the emulsified state, is effected at temperatures between 70° and 140° C., without splitting off a substantial amount of glycerine from the fatty oil by hydrosaponification and wherein the modified, vulcanized product thus produced is subsequently recovered from the emulsion.

10. The process of claim 1 wherein said fatty oil is a modified China-wood oil.

11. The process of claim 1 wherein said fatty oil is a modified linseed oil.

12. In the manufacture of vulcanized products from fatty oils of the class consisting of unmodified fatty oils and modified fatty oils, the process which comprises mixing such fatty oil with a vulcanizing agent, heating said mixture at a suitable temperature for sufficient time to partially vulcanize the said fatty oil, dissolving said partially vulcanized fatty oil in an organic solvent, and then producing an emulsion of said solution in an aqueous medium, and removing said organic solvent from said aqueous emulsion.

13. The process of claim 12 wherein said vulcanizing agent is sulphur and said partial vulcanization is effected at a temperature between 120° and 160° C., wherein said emulsion is produced by gradually mixing said organic solution with the aqueous medium at temperatures between 75 and 80° C. and the solvent is removed while the emulsion is stirred at said temperatures to produce a uniform emulsion, and wherein said partially vulcanized product is further vulcanized while maintained in the emulsified form until the desired vulcanization is obtained.

14. In the vulcanization of fatty oils of the drying and semi-drying type, the process which comprises mixing the said fatty oils with a vulcanizing agent, partially vulcanizing the said mixture to produce a partially vulcanized fatty oil which is soluble in benzene but insoluble in acetone, and then emulsifying the said partially vulcanized fatty oils in an aqueous medium and completing the vulcanization of the same to such a degree that the final vulcanization product is insoluble in both benzene and acetone, the vulcanization being completed without substantially hydrosaponifying the glyceride.

15. In the manufacture of vulcanized fatty glycerides from fatty oils, the steps which comprise mixing a fatty oil with sulphur, heating the mixture to vulcanizing temperatures until a vulcanized product substantially insoluble in acetone, but soluble in benzene is obtained, and then emulsifying the said vulcanized product in an aqueous liquid.

16. In the manufacture of vulcanized fatty oils, emulsified in an aqueous medium and suitable for direct blending with rubber latex and like emulsions, the steps which comprise heating a mixture of fatty oil and sulphur to vulcanizing temperatures, partially cooling the vulcanized oil so obtained, said cooling being insufficient to solidify said vulcanized oil, and then emulsifying the partially cooled, still-fluid vulcanized oil in an aqueous solution to produce an aqueous emulsion of said vulcanized oil.

17. In the manufacture of vulcanized oil products from fatty oils, including raw fatty oils and modified and bodied fatty oils, the step which comprises effecting some part of the vulcanization while said fatty oil is maintained in an emulsified state in an aqueous medium at a temperature below 160° C., the vulcanizing agent being dispersed and contained in the fatty oil, vulcanization in the emulsified state being effected without hydrosaponifying the fatty oil.

18. In the manufacture of vulcanized products from unsaturated organic compounds capable of being sulphurized, the steps which comprise dissolving or colloidally dispersing sulphur in such organic compounds by heating and agitating a mixture thereof to a temperature sufficient to render the sulphur molten and to dissolve it in said organic compound, the time of heating being less than that required to complete the vulcanization and then emulsifying the sulphur-containing product so obtained, in an aqueous medium before completing the said vulcanization to form products having the desired properties, and finally completing the desired vulcanization while the sulphur-containing material is maintained in the emulsified form, by heating the said emulsion thereof to temperatures below 160° C., without hydrosaponifying the vulcanized product.

19. The process of claim 18 wherein the sulphur is added to a hot oil.

20. The process of claim 18 wherein said organic compound is a modified isocolloid substance containing a minor amount of a polar compound dispersed therein to modify its properties.

21. The process of claim 1 wherein said vulcanizing agent is sulphur and said fatty oil is a modified oil, said oil being modified and bodied with a metal salt dispersed in the oil prior to adding the sulphur.

22. The process of claim 3 wherein the oil is modified with a metal salt before the vulcanized oil product is recovered from the said emulsion.

23. The process of claim 1 wherein the aqueous emulsion of vulcanized oil is treated with cadmium iodide to further modify the said oil product.

24. The process of claim 1 wherein the said emulsification of the vulcanized oil in an aqueous medium is effected at temperatures between 70° and 120° C.

25. In an improved method of making compositions of vulcanized oil products for direct addition to aqueous dispersions of rubber, the steps which comprise vulcanizing the oil by heat-treatment thereof with sulphur and thereafter, while the vulcanized oil is still, from the vulcanizing step, at a temperature to be fluid, emulsifying it by addition with agitation of an aqueous liquid.

LÁSZLÓ AUER.
PAUL STAMBERGER.